United States Patent [19]
Kincaid

[11] 3,916,731
[45] Nov. 4, 1975

[54] CIRCULAR SAW BLADE SHARPENER
[76] Inventor: Keith L. Kincaid, 1530 Washington, E., Charleston, W. Va. 25311
[22] Filed: June 18, 1974
[21] Appl. No.: 480,500

[52] U.S. Cl.......................................... 76/41; 76/37
[51] Int. Cl.².................................... B23D 63/12
[58] Field of Search ...................... 76/37, 40, 41, 45

[56] References Cited
UNITED STATES PATENTS

| | | | |
|---|---|---|---|
| 802,528 | 10/1905 | Seek | 76/41 |
| 908,304 | 12/1908 | Miner | 76/41 |
| 2,453,638 | 11/1948 | Nietfeld | 76/41 |
| 2,798,384 | 7/1957 | Kester | 76/40 |
| 2,867,953 | 1/1959 | Kennerty | 76/37 X |
| 2,870,657 | 1/1959 | Hogue | 76/40 |
| 2,875,648 | 3/1959 | Garrison | 76/41 |
| 3,020,783 | 2/1962 | Hill | 76/37 |
| 3,779,103 | 12/1973 | Silvey | 76/40 |

*Primary Examiner*—Harrison L. Hinson
*Attorney, Agent, or Firm*—Clarence A. O'Brien; Harvey B. Jacobson

[57] ABSTRACT

A circular saw blade fixedly clamped in place, pivotally mounts a carrier assembly on adjustable arms on which a grinding disc is supported for rotation and axial displacement against a centering spring bias by means of a drive shaft to which an actuating crank handle is attached. The disc and drive shaft are angularly positioned by the carrier assembly relative to the saw blade teeth about two axes intersecting the drive shaft parallel to and perpendicular to the plane of the saw blade.

4 Claims, 6 Drawing Figures

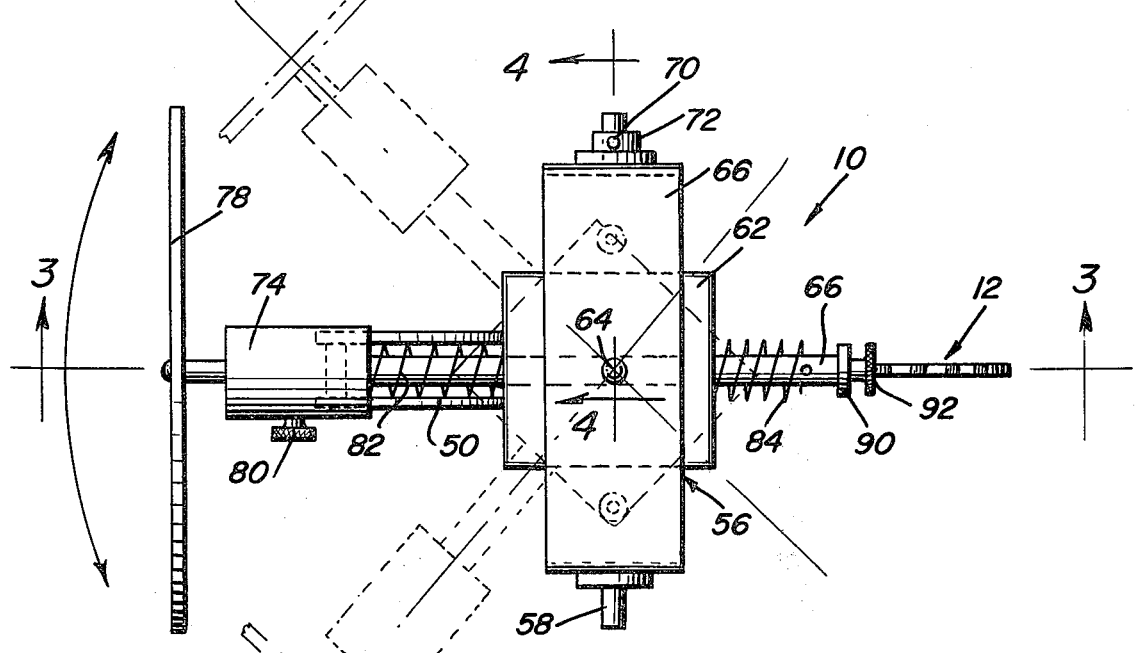
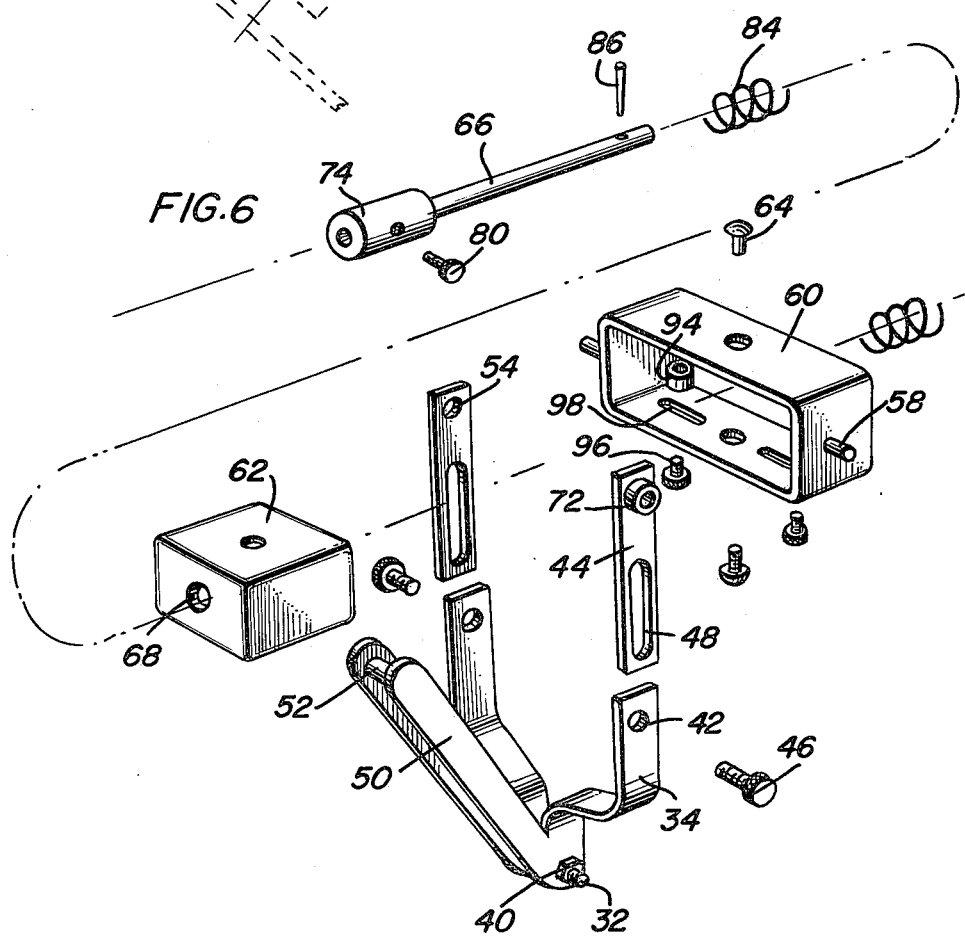

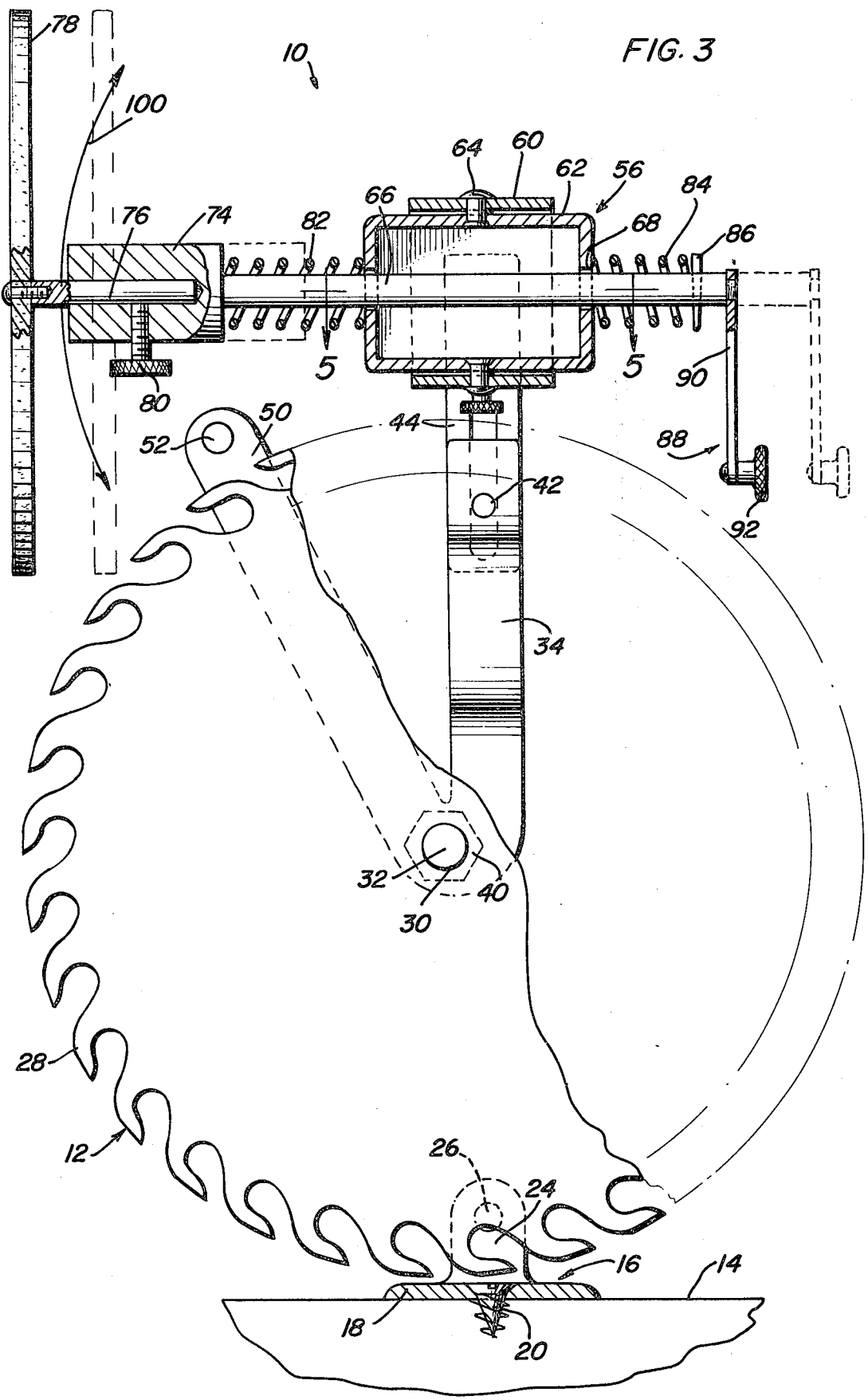

CIRCULAR SAW BLADE SHARPENER

This invention relates to a device for sharpening the teeth of a circular saw blade.

The sharpening of the peripheral teeth on a circular saw blade by a rotary grinding wheel or disc carried by a portable device engageable with the saw blade held fixed in a clamp, is well known as disclosed for example in U.S. Pat. Nos. 128,553 and 2,650,508. Such prior sharpening devices were either very limited in use and sharpening ability or difficult and complex in effecting the proper sharpening of different type teeth associated with circular saw blades. It is therefore an important object of the present invention to provide an implement that is easy to install and simple to use for complete and proper sharpening of the teeth on a circular saw blade utilizing a manually driven abrasive disc.

In accordance with the present invention, a circular saw blade is fixedly clamped in place with little obstruction of its peripheral teeth and leaving its central opening free for the reception of a pivot assembly associated with a pivotal support on which a universally pivoted carrier assembly is mounted in radially adjustable relation to the circular saw blade. A drive shaft is slidably and rotationally mounted on the carrier assembly with an actuating handle connected to one end for rotation thereof. An abrasive disc secured to the other end of the drive is axially displaced against the bias of a pair of centering springs by the actuating handle to advance the disc into engagement with the saw teeth from any angular position to which the carrier assembly is displaced relative to the rotational axis of the saw blade. Adjustable stops limit the position to which the disc is displaced for grinding the teeth at desired tooth angle laterally of the saw blade.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of the device of the present invention arranged in association with a typical circular saw blade for sharpening the same.

FIG. 3 is an enlarged side section taken substantially through a plane indicated by section line 3—3 in FIG. 1, with parts broken away and shown in section.

FIG. 6 is a perspective view showing most of the disassembled parts of the sharpening device.

Figure 2:
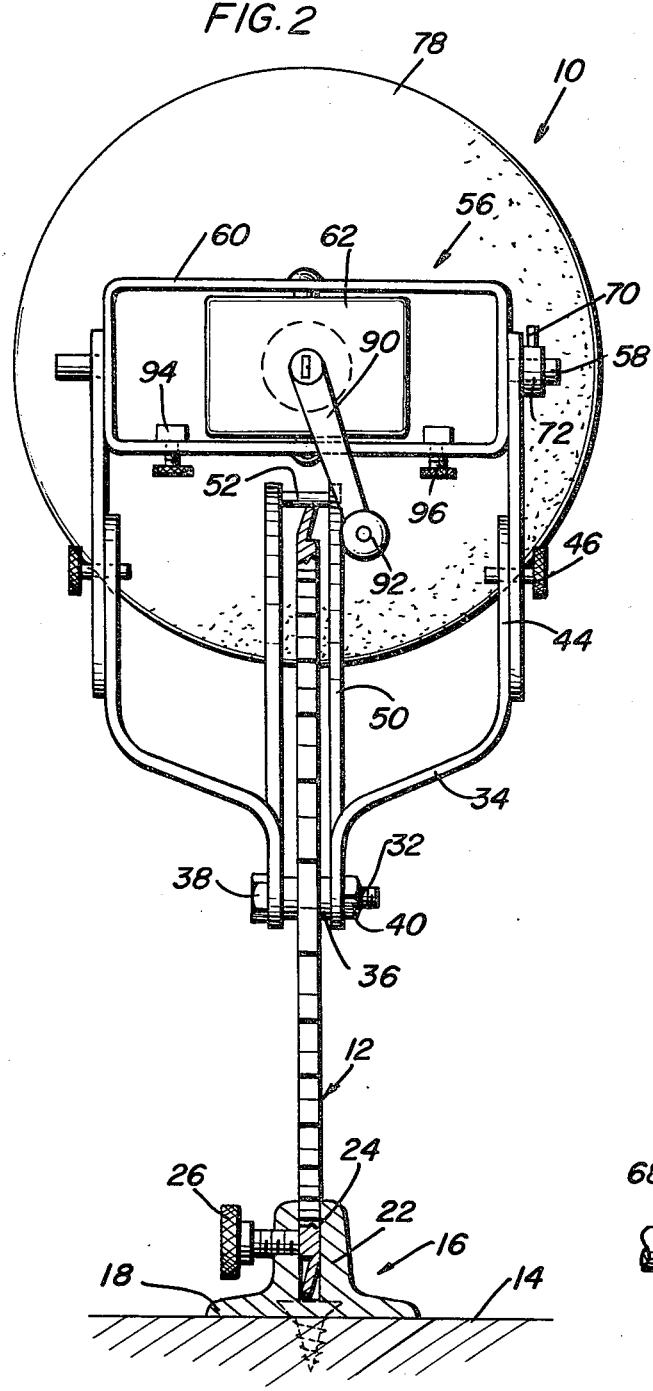
FIG. 2 is a rear elevation view of the arrangement shown in FIG. 1 with the blade clamp shown in section.

Referring now to the drawings in detail, FIGS. 1, 2 and 3 illustrate the sharpening device 10 assembled for use on a circular saw blade 12 that is fixedly held above a supporting surface 14 of a tabletop or workbench by means of a clamp fitting 16. The clamp fitting includes a base portion 18 secured by a fastener 20 to the surface 14 and an upstanding portion 22 having a slot 24 within which a small peripheral portion of the blade is received. A lock screw 26 threadedly extends laterally through portion 22 of the clamp fitting into engagement with the blade within the slot 24 to fixedly hold the blade in place.

As more clearly seen in FIG. 3, the saw blade 12 has peripheral teeth 28 and a central opening 30 through which its rotational axis extends when installed in a power saw machine. The central opening as shown in FIGS. 2 and 3 receives a pivot bolt 32 on which a pair of support arms 34 are mounted for pivotal movement about the axis of the saw blade. Bushings 36 axially space the support arms along the pivot bolt 32 on opposite sides of the saw blade between the head 38 of the bolt and the assembly nut 40 as more clearly seen in FIG. 2. The support arms diverge upwardly from the pivot bolt toward more widely spaced, parallel portions having aligned threaded openings 42 through which saddle bars 44 are adjustably secured by adjustment screws 46. The screws 46 accordingly extend through slots 48 in the saddle bars 44 and are threadedly received in the holes 42 to form extensions of the support arms 34 projecting radially beyond the saw blade. The support arms have legs 50 extending at an acute angle thereto from the pivot bolt and interconnected by a pin 52 in close radially spaced relation to the periphery of the saw blade.

The upper ends of the saddle bars 44 have openings 54 for pivotally supporting a carrier assembly 56 about a pivot axis generally perpendicular to the plane of the saw blade. As more clearly seen in FIGS. 4 and 6, the openings 54 receive axles 58 that extend from a rectangular pivot bracket 60 associated with the carrier assembly. A carrier block member 62 is pivotally mounted within the bracket 60 by a pair of pivot pin rivets 64 aligned along a pivot axis that is substantially coplanar with the saw blade. The perpendicular intersecting axes of axles 58 and pivot pins 64 thus form a universal joint between the support arms 34 and a drive shaft 66 extending through aligned openings 68 formed in the block member 62 as more clearly seen in FIGS. 3 and 5. The carrier assembly 56 is held assembled on the support arms by a setscrew 70 threaded through a collar 72 on one of the axles 58.

It will be apparent from FIG. 3, that the drive shaft 66 is rotatably and slidably supported in the block member 62 of the carrier assembly and may be angularly positioned relative to the fixedly clamped saw blade about perpendicularly intersecting axes established by the carrier assembly 56 and about an axis through the central opening 30 in the saw blade. A holder block 74 is secured to one end of the drive shaft and has a bore receiving the mounting pin 76 of an abrasive wheel disc 78. A setscrew 80 releasably locks the pin and disc to the holder. The drive shaft with the disc 78 assembled thereon is yieldably held in a predetermined axial position on the carrier assembly by a pair of centering springs 82 and 84. Spring 82 encircles the drive shaft between the holder 74 and the block 62 while spring 84 encircles the drive shaft between the block 62 and a tapered pin 86 extending transversely through the drive shaft in closely spaced relation to an end opposite the disc holder 74 to which an actuating handle assembly 88 is connected. The handle assembly includes a drive crank 90 and a knob 92 as more clearly seen in FIG. 2 and 3. The disc 78 may thereby be manually rotated about the axis of the drive shaft 66 and axially displaced against the continuous bias of the centering spring 82 to advance it into engagement with the teeth of the saw blade. The spring 84 will return the disc to its position retracted from the saw blade upon release of the handle assembly.

Figure 4:
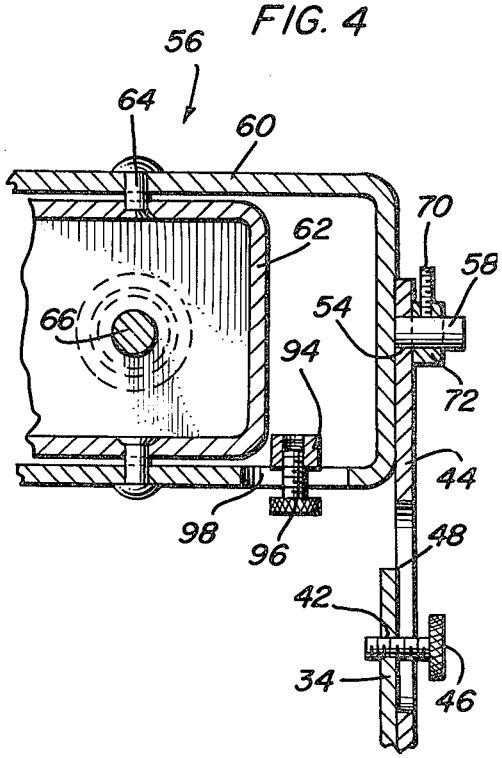
FIG. 4 is an enlarged partial section view taken substantially through a plane indicated by section line 4—4 in FIG. 1.
Figure 5:
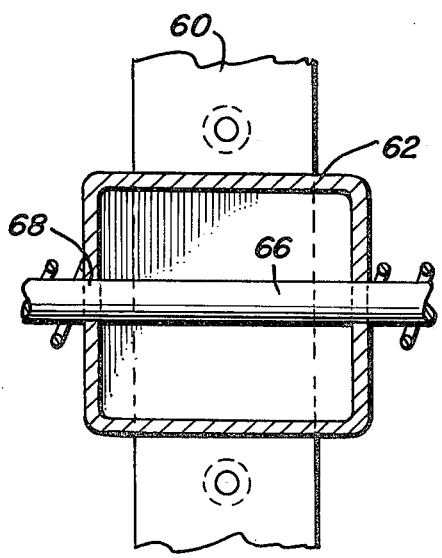
FIG. 5 is a partial section view taken substantially through a plane indicated by section line 5—5 in FIG. 3.

The bracket 60 in the carrier assembly is provided with a pair of angle stops 94, as more clearly seen in FIGS. 2 and 4, that are held in adjusted positions in the bracket by screws 96 extending through slots 98. These stops limit the angular positions to which the block 62 is displaceable about the axis extending through pivot pins 64 as shown by dotted line in FIG. 1. The angle stops are adjusted, therefore, to the desired tooth angle of the saw blade teeth 28 to be sharpened.

To use the sharpening device, the saw blade is clamped in fitting 16 and the rest of the device is assembled on the saw blade by means of pivot bolt assembly in central opening 30. The carrier assembly 56 is then angularly positioned by the support arms 34 about the periphery of the saw blade to sequentially sharpen each tooth 28. The saw blade is repositioned in the clamp fitting 16 in order to sharpen the tooth previously covered by the fitting. In sharpening each tooth, the angle stops 94 are set for the desired tooth angles as aforementioned and the disc 78 is advanced into engagement with the tooth by pulling on the handle assembly 88 against the bias of spring 82, as shown by dotted line in FIG. 3, while the disc is being rotated. The disc will travel in a path parallel to the axis of the drive shaft 66 which may be angularly displaced as shown by arrow 100 in order to contact the desired surfaces of the tooth. The radial position of the carrier assembly 56 on the support arms 34 is adjusted through the saddle bars 44 for desired axial travel of the disc 78 in chordal relation to the saw blade for sharpening of the various tooth surfaces. The outer peripheral edge surfaces of the teeth may also be sharpened by adjusting the saddle bar extensions of the support arms 34 so that the travel of the disc 78 will be tangential to the saw blade.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for sharpening peripheral teeth on a circular saw blade, said device comprising a drive shaft, an abrasive disc secured to the drive shaft, a pivotal carrier assembly rotatably and slidably mounting the drive shaft for rotation and longitudinal shifting of the shaft relative to the carrier assembly about and along, respectively, a first rotational axis spaced from the saw blade, means mounted on the carrier assembly for continuously biasing the shaft to a centered position intermediate limit positions of shifting of said shaft relative to said carrier assembly, support means pivotally mounted on the saw blade within the central opening thereof and supporting the carrier assembly therefrom for angular displacement of the carrier assembly relative to the saw blade about the center axis of the saw blade comprising a second axis, said support means including a pair of generally parallel adjustable length support arms extending generally radially of said blade on opposite sides thereof, said carrier assembly being pivotally supported between said support arms outwardly of the peripheral teeth on said blade for displacement about a third axis extending between said support arms, a carrier block oscillatably supported from said carrier assembly for displacement about a fourth axis normal to said first and third axes and contained in the plane of said blade, and actuating means connected to the drive shaft for (1) axial displacement of said shaft along said first axis for engagement of said disc with the peripheral teeth of the saw blade and (2) rotation of said shaft.

2. The combination of claim 1 including a clamp fitting having first mounting means for stationary support of said fitting from a suitable support structure, said clamp fitting including a slotted portion for removably receiving one small sector outer peripheral portion of said saw blade therein, said slotted portion including a clamp screw operatively associated therewith for releasably clampingly engaging said peripheral portion to stationarily support said circular saw blade from said fitting.

3. The combination of claim 1 wherein said continuous biasing means includes a pair of centering springs mounted on the drive shaft in engagement with said carrier block through which the drive shaft slidably extends.

4. The combination of claim 1 including adjustable stop means mounted on the carrier member for limiting pivotal displacement of the carrier block about said fourth pivot axis to positions corresponding to the desired tooth angles of the disc.

* * * * *